Jan. 17, 1933.  J. L. DE RABOT  1,894,904
MOTOR MOUNT
Filed Aug. 5, 1931
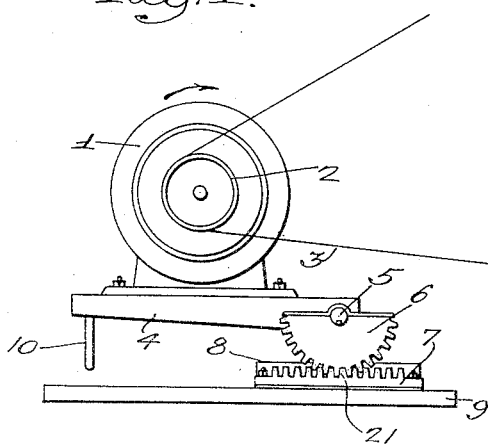
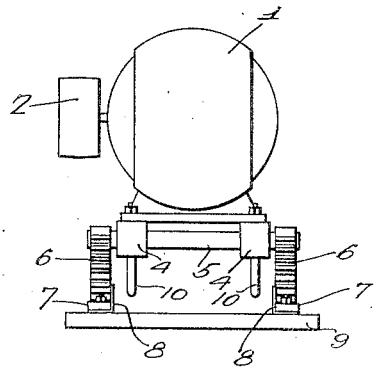
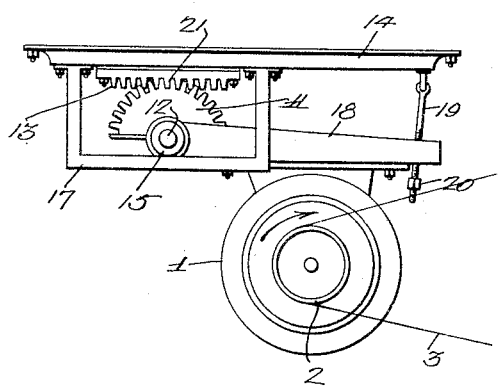
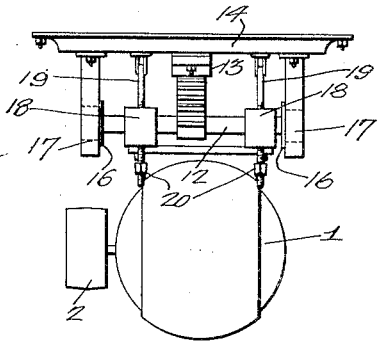
Inventor:
John L. de Rabot
by his Attorneys
Howson & Howson Patented Jan. 17, 1933

1,894,904

UNITED STATES PATENT OFFICE

JOHN L. DE RABOT, OF PHILADELPHIA, PENNSYLVANIA

MOTOR MOUNT

Application filed August 5, 1931. Serial No. 555,381.

The present invention relates to devices for supporting machines, such as electric motors, which are connected to flexible driving belts or similar driving connections and are adapted to either drive other machines or to be driven thereby through the medium of the connections.

An object of the invention is to provide a novel supporting device which is so constructed as to automatically and uniformly maintain the tension of the flexible driving connection at a predetermined value.

Another object of the invention is to provide a variable fulcrum pivotal supporting device for the motor or other machine to be supported.

A further object of the invention is to provide a supporting device of the indicated character whose fulcrum varies in accordance with position variations of the supported machine occasioned by the stretching of the driving connection or otherwise.

A still further object of the invention is to provide a supporting device of the class indicated which eliminates mechanical connection of the supported machine to the floor or other supporting surface and which permits the use of the machine in different locations with different bases.

Other objects of the invention will be apparent hereinafter. Reference to the following detailed description and accompanying drawing may be had for a complete understanding of the invention.

In the drawing:

Fig. 1 is a side elevational view of a device constructed in accordance with the invention and which is adapted for floor mounting of a motor or other machine;

Fig. 2 is an end elevational view of the device of Fig. 1;

Fig. 3 is a side elevational view of a modified form of device which is adapted for ceiling mounting or suspension of the supported machine; and Fig. 4 is an end elevational view of the device of Fig. 3.

In Figs. 1 and 2, 1 is a motor and 2 the pulley over which runs the belt 3. The motor is mounted on two arms 4 by means of suitable bolts and nuts. The openings in the arms through which these bolts pass are in the shape of long slots in order to enable regulation of the distance of the motor from the supporting shaft 5 to which the arms 4 are firmly attached by means of suitable keys. On this same shaft is also securely attached, at each end, a gear portion 6. These gear portions mesh with suitable racks 7 and guides 8 to maintain the gears in proper position on the racks. These racks are set at the proper distance with reference to the gears and are bolted down to a platform or to the floor 9 where the motor is to be operated. Supporting legs 10 keep the device at the proper level when the belt is off the motor pulley and serve to limit the falling movement of the device in the event that the belt breaks or slips off the pulley.

In the device of Figs. 3 and 4, for ceiling mounting, the same principle applies as in Figs. 1 and 2. However, in this case a single gear portion 11 is located in the center of a supporting shaft 12, being properly keyed to it. This gear meshes with a rack 13 carried by supporting plate 14. At each end of this shaft is mounted a small wheel 15, which is flanged on one side at 16 and adapted to turn freely on the shaft ends. These wheels are mounted for rolling on supporting tracks 17 also carried by plate 14. Arms 18 are keyed to this shaft in the same manner as described for floor mounting. At the other end of each of arms 18 is provided an adjusting rod 19 which is hingedly attached at one end to the ceiling plate 14. The other end of each of these rods is threaded and is provided with a large nut 20. These rods can move freely through slots (not visible) in the ends of the arms 18. The width of each of these slots is slightly larger than the diameter of the rods.

When the belt is not on the pulley, the nuts are moved upward on the rods in order to stop arms 18 with the motor from moving downward. On the other hand, when the belt is placed on the pulley, the nuts are moved downward in order to allow the motor to move downward also, until it rests on the belt. The nuts should be moved down a little distance from the slots in order to give the mechanism complete freedom of action, but not too far so that in case of the belt breaking or jumping off the pulley, the nuts would again act as a check in preventing the device from moving downward any further than where the nuts are set on the rod.

From the above description, it may be seen that the swinging action of the mechanism caused by the weight of the motor placed upon it results in the imparting to belt 3 of a certain tension. This results not only because of the swinging action itself, but also because of the tendency of the device to move away from the driven machinery through the action of the gear portions in mesh with the stationary racks. It is obvious that the mechanism can only move away from the driven machinery when belt elongation occurs or when simply the load is applied to the belt causing it to stretch.

Furthermore, and this is the essential point, it is to be noted that the mechanism swings on a variable fulcrum at 21. When the position of the motor varies on account of belt stretch or any other reason, the pivoting point 21 varies also. This novel feature is very valuable in order to maintain a desired belt tension approximately constant.

In the devices illustrated, it will be apparent that the supported machine is maintained in equilibrium about a variable pivot point offset from the gravitational axis of the machine. By "gravitational axis" I mean a vertical line passing through the center of gravity of the machine.

Considering the device of Figs. 1 and 2, it is obvious that the machine due to its weight tends to rotate counterclockwise about its point of pivotal suspension 21. In other words, the weight of the machine and the perpendicular distance from the pivot point or fulcrum to the direction of action of said weight constitutes a force moment tending to rotate the machine as above stated. A second force moment acting against the first force moment is constituted by the belt tension due to the weight of the machine and the perpendicular distance from the pivot point to the direction of action of the belt tension. Thus, one force moment may be expressed $W \times a$, where $W$ is the weight of the machine and $a$ is the moment arm, while the other force moment may be expressed $T \times b$, where $T$ is the tension of the belt due to weight of the machine and $b$ is the moment arm. Obviously, $W \times a = T \times b$ and $T = \frac{W \times a}{b}$. Now if $T$ is to remain constant the ratio $\frac{a}{b}$ must be maintained substantially constant. Assuming now that the belt were to lengthen, if a fixed pivot point or fulcrum were provided, the moment arm $a$ would obviously increase and the moment arm $b$ would decrease, due to the rotation of the machine about the fulcrum. The ratio $\frac{a}{b}$ would therefore change.

By virtue of the variable fulcrum arrangement of the invention, however, the pivot point may be caused to move to the left such a distance as to maintain the moment arm ratio substantially constant. This, of course, results in the maintaining of the belt tension due to the weight of the machine substantially constant. By proper design, the horizontal movement of the pivotal point may be caused to be such as to maintain the moment arm ratio substantially constant throughout the range of belt lengthening in any particular installation. Let us assume, for example, that originally moment arm $a$ is twenty-four inches and the moment arm $b$ is eighteen inches. Then, the moment arm ratio is 4/3. Now if the belt lengthens $a$ would increase and $b$ would decrease if the pivot point were fixed. By proper design of my apparatus in any particular case, however, the pivot point may be caused to move horizontally such a distance as to maintain a moment arm ratio of 4/3, thus causing the belt tension due to the weight of the supported device to remain substantially constant.

In the device of Figs. 3 and 4, the same result may be had. In this case, if it be assumed that the belt lengthens, the tendency is for the moment arm $a$ to decrease and moment arm $b$ to increase, but here also by virtue of the variable fulcrum arrangement, the fulcrum moves horizontally to the left to maintain the moment arm ratio substantially constant, thereby maintaining the belt tension due to the weight of the machine substantially constant. It is important to note that the essential feature of the invention, as illustrated by the two embodiments herein, is that the fulcrum moves in the horizontal direction taken by the center of gravity of the machine when the belt lengthens.

A device constructed in accordance with the principles of the invention will enable a desired predetermined belt tension to be kept during practically the entire life of a belt without the necessity of adjustment or attention to any part of the mechanism. Such a device is, therefore, entirely automatic and is not susceptible to human neglect or carelessness. It is also to be noted in connection with the device for floor mounting that an additional feature exists which is highly desirable. Since the motor is not mechanically attached to the floor or supporting surface 9, but the gear portions 6 are merely placed upon their co-acting racks 7, the motor may be used in different locations with different stationary racks. It is merely necessary to lift the motor and the elements carried thereby and place it in cooperative relation with any other racks in different locations. This feature is especially important in the case of small motors which can be readily carried about by hand and may be used in different locations to drive different machines.

While I have disclosed herein two embodiments of the invention, it will be apparent that various modifications and changes in the details of construction of the device are possible and within the scope and spirit of the invention. The invention is, of course, applicable to any machine, the illustration of its use with a motor herein being only for the purpose of disclosure.

I claim:

1. In a drive mechanism comprising a plurality of devices connected for power transmission therebetween by a flexible driving connection, means for pivotally mounting one of said devices about a variable pivot point offset from the gravitational axis of said device, whereby said device is maintained in equilibrium with respect to the pivot point by force moments due to its weight and the tension of said driving connection, said means comprising a stationary run-way and a rocker element in engagement with said run-way, whereby the position of the pivot point varies with movement of said device to maintain the ratio of the moment arms of said force moments substantially constant.

2. In a drive mechanism comprising a plurality of devices connected for power transmission therebetween by a flexible driving connection, means for pivotally mounting one of said devices about a variable pivot point offset from the gravitational axis of said device, whereby said device is maintained in equilibrium with respect to the pivot point by force moments due to its weight and the tension of said driving connection, said means comprising a stationary gear rack and a gear wheel segment in engagement with said gear rack, whereby the position of the pivot point varies with movement of said device to maintain the ratio of the moment arms of said force moments substantially constant.

3. In a drive mechanism comprising a plurality of devices connected for power transmission therebetween by a flexible driving connection, means for pivotally mounting one of said devices about a variable pivot point offset from the gravitational axis of said device, whereby said device is maintained in equilibrium with respect to the pivot point by force moments due to its weight and the tension of said driving connection, said means comprising a stationary run-way and a rocker element in engagement with said run-way, whereby the position of the pivot point varies with movement of said device to maintain the ratio of the moment arms of said force moments substantially constant, and means for limiting the pivotal movement of said device in the event of failure of said driving connection.

JOHN L. DE RABOT.